United States Patent
Gilarranz et al.

(10) Patent No.: US 9,419,492 B2
(45) Date of Patent: Aug. 16, 2016

(54) INTERFACE FOR THE TRANSMISSION OF ELECTRICAL POWER TO A MOTOR-COMPRESSOR

(71) Applicants: Jose L. Gilarranz, Katy, TX (US); William C. Maier, Almond, NY (US); William C. Egan, Menasha, WI (US); Axel Moehle, Berlin (DE); Patrick Gels, Berlin (DE); Marco Festa, Falkensee (DE); Andreas Bethge, Berlin (DE); Pal Benestad, Drammen (NO); Jonas Nelson, Svelvik (NO)

(72) Inventors: Jose L. Gilarranz, Katy, TX (US); William C. Maier, Almond, NY (US); William C. Egan, Menasha, WI (US); Axel Moehle, Berlin (DE); Patrick Gels, Berlin (DE); Marco Festa, Falkensee (DE); Andreas Bethge, Berlin (DE); Pal Benestad, Drammen (NO); Jonas Nelson, Svelvik (NO)

(73) Assignee: Dresser-Rand Company, Olean, NY (US)

( * ) Notice: Subject to any disclaimer, the term of this patent is extended or adjusted under 35 U.S.C. 154(b) by 43 days.

(21) Appl. No.: 14/468,590

(22) Filed: Aug. 26, 2014

(65) Prior Publication Data
US 2015/0061432 A1  Mar. 5, 2015

Related U.S. Application Data

(60) Provisional application No. 61/871,361, filed on Aug. 29, 2013.

(51) Int. Cl.
*H02K 3/50* (2006.01)
*H02K 5/10* (2006.01)
*H02K 5/22* (2006.01)
*H01R 13/187* (2006.01)
*H01R 13/52* (2006.01)

(52) U.S. Cl.
CPC .. *H02K 3/50* (2013.01); *H02K 5/10* (2013.01); *H02K 5/225* (2013.01); *H01R 13/187* (2013.01); *H01R 13/5219* (2013.01)

(58) Field of Classification Search
CPC ........................................... H02K 3/50
USPC ...................... 310/71, 87; 439/843
See application file for complete search history.

(56) References Cited

U.S. PATENT DOCUMENTS 5,341,058 A * 8/1994 Kohler ............... H02K 1/185
                                                              310/211
5,889,345 A * 3/1999 Iwata ................ B60T 8/4022
                                                              310/71

* cited by examiner

*Primary Examiner* — Abdullah Riyami
*Assistant Examiner* — Justin Kratt

(57) ABSTRACT

An interface for transmitting electrical power to a motor of a motor-compressor is provided. The interface may include a receptacle having a first end portion coupled with a stator of the motor and a second end portion defining a hole at least partially extending therethrough. The interface may also include a plug configured to be detachably coupled with the receptacle. The plug may include a rigid, conductive rod having a first end portion configured to be coupled with a penetrator of the motor-compressor, and a second end portion configured to be at least partially disposed in the hole of the receptacle and detachably coupled therewith. The rigid, conductive rod may be configured to electrically couple the penetrator with the receptacle, and the receptacle may be configured to transmit the electrical power to the stator.

17 Claims, 5 Drawing Sheets

INTERFACE FOR THE TRANSMISSION OF ELECTRICAL POWER TO A MOTOR-COMPRESSOR

CROSS-REFERENCE TO RELATED APPLICATIONS

This application claims priority to U.S. Provisional Patent Application having Ser. No. 61/871,361, which was filed Aug. 29, 2013. This priority application is hereby incorporated by reference in its entirety into the present application to the extent consistent with the present application.

BACKGROUND

Reliable and efficient compression systems have been developed and are used in a myriad of industrial processes (e.g., petroleum refineries, offshore oil production platforms, and subsea process control systems). There is, however, an ever-increasing demand for smaller, lighter, and more compact compression systems. Accordingly, compact motor-compressors that incorporate compressors directly coupled with high-speed electric motors have been developed. Conventional compact motor-compressors may combine a high-speed electric motor with a compressor, such as a centrifugal compressor, in a single, hermetically-sealed housing. In compact motor-compressors, the high-speed electric motor may operate in a process fluid contained in the housing, which may be maintained at a pressure from about 1 megapascal (MPa) to about 30 MPa. To deliver an electrical current across a pressure boundary of the housing and power the high-speed electric motor, high-voltage penetrators (HVPs) are often utilized. In topside or terrestrial (e.g., ground based) environments with ambient air external conditions, the HVPs may be contained in a pipe section extending from the sealed housing. These pipe sections, however, are neither practical nor adequate for the larger and more complex HVPs required in subsea environments.

In view of the foregoing, compact motor-compressors used in subsea environments may often include a terminal assembly or terminal box in lieu of the pipe section to couple with the HVPs. The terminal assembly may be mounted on the sealed housing and configured to couple with one or more HVPs. The HVPs may be configured to receive an electrical current from a sea- or land-based power source and transmit the electrical current to stator windings of the high-speed electric motor. In conventional compact motor-compressors, insulated, flexible cables may often be utilized to transmit the electrical current from the HVPs to the stator windings of the high-speed electric motor. The flexible cables, however, may be exposed to the process fluid contained in the housing, thereby resulting in the diffusion of the process fluid into the insulation thereof. In some cases, the process fluid may diffuse through the insulation and contact the conductive cables contained therein. During rapid gas decompression events, the process fluid contained in the flexible cables may depressurize and rapidly expand within the flexible cables, thereby compromising the structural integrity of the insulation. In some cases, the depressurization and rapid discharge of the process fluid may cause the insulation to rupture, thereby exposing the conductive elements contained therein.

What is needed, then, is an improved system and method for transmitting electrical power from a high-voltage penetrator to a motor of a compact motor-compressor.

SUMMARY

Embodiments of the disclosure may provide an interface for transmitting electrical power to a motor of a motor-compressor. The interface may include a receptacle having a first end portion coupled with a stator of the motor and a second end portion defining a hole at least partially extending therethrough. The interface may also include a plug configured to be detachably coupled with the receptacle. The plug may include a rigid, conductive rod having a first end portion configured to be coupled with a penetrator of the motor-compressor, and a second end portion configured to be at least partially disposed in the hole of the receptacle and detachably coupled therewith. The rigid, conductive rod may be configured to electrically couple the penetrator with the receptacle, and the receptacle may be configured to transmit the electrical power to the stator.

Embodiments of the disclosure may further provide another interface for transmitting electrical power to a motor of a motor-compressor. The interface may include a penetrator assembly that may be detachably coupled with a housing of the motor-compressor about an aperture extending through the housing. The penetrator assembly may be configured to receive the electrical power from a power source located external to the housing and transmit the electrical power to the motor disposed in the housing. The interface may also include a receptacle having a first end portion coupled with a stator of the motor and a second end portion defining a hole at least partially extending therethrough. The interface may further include a plug configured to be detachably coupled with the receptacle. The plug may include a rigid, conductive rod having a first end portion coupled with the penetrator assembly and a second end portion configured to be at least partially disposed in the hole of the receptacle and detachably coupled therewith. The rigid, conductive rod may be configured to electrically couple the penetrator assembly with the receptacle.

Embodiments of the disclosure may further provide a motor-compressor. The motor-compressor may include a housing having a motor disposed therein. The housing may define an aperture extending therethrough, and a penetrator may be detachably coupled with the housing about the aperture and configured to transmit electrical power to the motor. A conduit may be coupled with a power source located external to the housing and the penetrator. The conduit may be configured to transmit the electrical power from the power source to the penetrator. A receptacle may be coupled with a stator of the motor. The motor-compressor may also include a rigid, conductive plug having a first end portion coupled with the penetrator and a second end portion configured to be detachably coupled with the receptacle. The rigid, conductive plug may be configured to electrically couple the penetrator with the receptacle.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
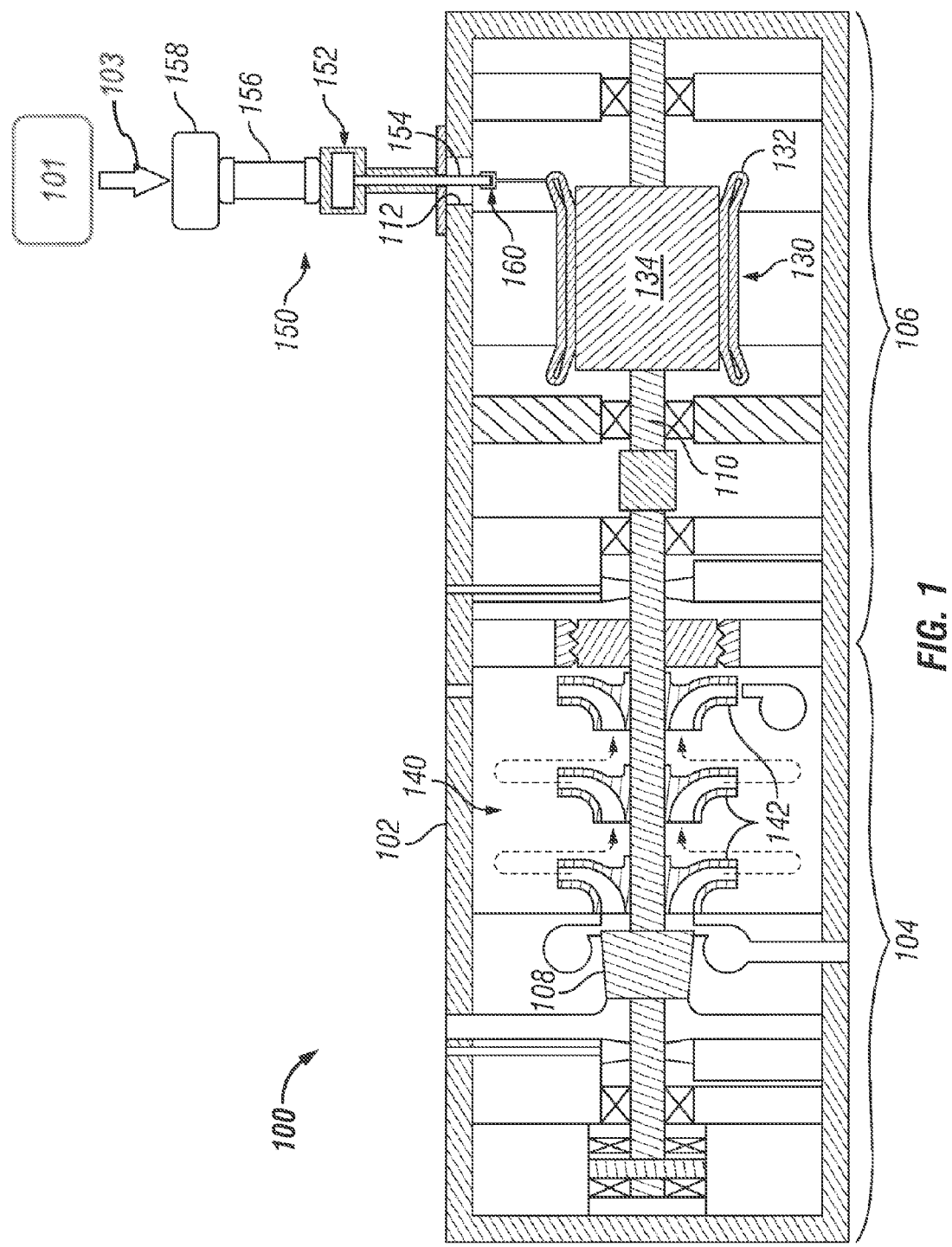
FIG. 1 illustrates a cross-sectional, schematic view of a compact motor-compressor, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a cross-sectional, schematic view of an exemplary compact motor-compressor 100 including an exemplary high-voltage penetrator assembly 150, according to one or more embodiments. The motor-compressor 100 may include a housing 102 having a compressor portion 104 and a motor portion 106. The housing 102 may contain and hermetically seal a motor 130, a compressor 140, an integrated separator 108, or any combination thereof. The motor 130 may be disposed in the motor portion 106 of the housing 102, and the compressor 140 may be disposed in the compressor portion 104 of the housing 102. The motor 130 may be coupled with the compressor 140 via a rotary shaft 110 extending substantially along an axial length of the housing 102.

The motor 130 may be an electric motor, such as an induction motor, and may include a stator 132 and a rotor 134. It may be appreciated, however, that other embodiments may utilize other types of electric motors including, but not limited to, synchronous motors, permanent magnet motors, DC motors, or the like. The compressor 140 may be a multi-stage centrifugal compressor with one or more compressor stage impellers (three are shown 142). It may be appreciated, however, that any number of impellers 142 may be implemented or used without departing from the scope of the disclosure.

In at least one embodiment, the motor-compressor 100 may include the integrated separator 108 coupled with the motor 130 via the rotary shaft 110. In another embodiment, the integrated separator 108 may be omitted from the motor-compressor 100. The integrated separator 108 may be configured to separate and remove higher-density components from lower-density components contained within a process fluid introduced thereto. The higher-density components (i.e., liquids and/or solids) removed from the process fluid may be discharged from the integrated separator 108 via a discharge line (not shown), thereby providing a relatively dry process fluid to be introduced into the compressor 140. Especially in subsea applications where the process fluid may commonly be multiphase, any separated liquids discharged via the discharge line may accumulate in a collection vessel (not shown) and be subsequently pumped back into the process fluid at a pipeline (not shown) located downstream of the compressor 140. Otherwise, the separated liquids may alternatively be drained into the collection vessel for subsequent disposal.

In at least one embodiment, the high-voltage penetrator assembly 150 may be coupled with the housing 102 and configured to transmit electrical power from a remotely-located, sea- or land-based power source 101 to the motor 130. For example, the motor portion 106 of the housing 102 may define one or more apertures (one is shown 112) extending therethrough and configured to provide communication or access to the motor 130 disposed therein, and the high-voltage penetrator assembly 150 may be coupled with the housing 102 about the aperture 112 to provide the electrical power from the power source 101 to the motor 130. The high-voltage penetrator assembly 150 may include one or more high-voltage penetrators (HVPs) (one is shown 152) configured to receive the electrical power and transmit the electrical power across a pressure boundary of the housing 102 to the motor 130 disposed therein. In at least one embodiment, the electrical power directed to the motor 130 may be utilized to operate or drive any pressurized motor driven application. For example, the electrical power directed to the motor 130 may be utilized to operate the compressor 140, the integrated separator 108, a pump (not shown), a valve actuator (not shown), or the like, or any combination thereof. In at least one embodiment, the HVP 152 may include or be coupled with a conductive rod 154 configured to transmit the electrical power to the stator 132 of the motor 130. For example, the HVP 152 may include one or more conductive pins (not shown) coupled with the conductive rod 154. In another example, as further described herein, the conductive rod 154 may extend through and be coupled with at least a portion of the HVP 152. As further described herein, the HVP 152 and/or the conductive rod 154 may be detachably coupled with the stator 132, and/or components thereof, via an interface 160.

In an exemplary embodiment, the high-voltage penetrator assembly 150 may include a conduit or hose 156 having one or more electrical cables or connectors (not shown) disposed therein. In at least one embodiment, the conduit 156 may be a pressure-balanced conduit coupled with the HVPs 152 and configured to isolate the electrical cables disposed therein from the ambient environment (e.g., sea water). For example, the pressure-balanced conduit may be filled with a non-conducting fluid, such as oil, and the non-conducting fluid may encompass and/or isolate the electrical cables from the ambient environment. In at least one embodiment, a high-voltage junction box 158 may be coupled with the conduit 156 and/or the electrical cables disposed therein. The high-voltage junction box 158 may be electrically coupled with the sea- or land-based power source 101 and configured to transmit the electrical power from the power source 101 to the HVPs 152 of the penetrator assembly 150 via the electrical cables of the conduit 156. In at least one embodiment, the high-voltage junction box 158 may be electrically coupled with the power source 101 via one or more cables, as indicated by arrow 103.

Figure 2A:
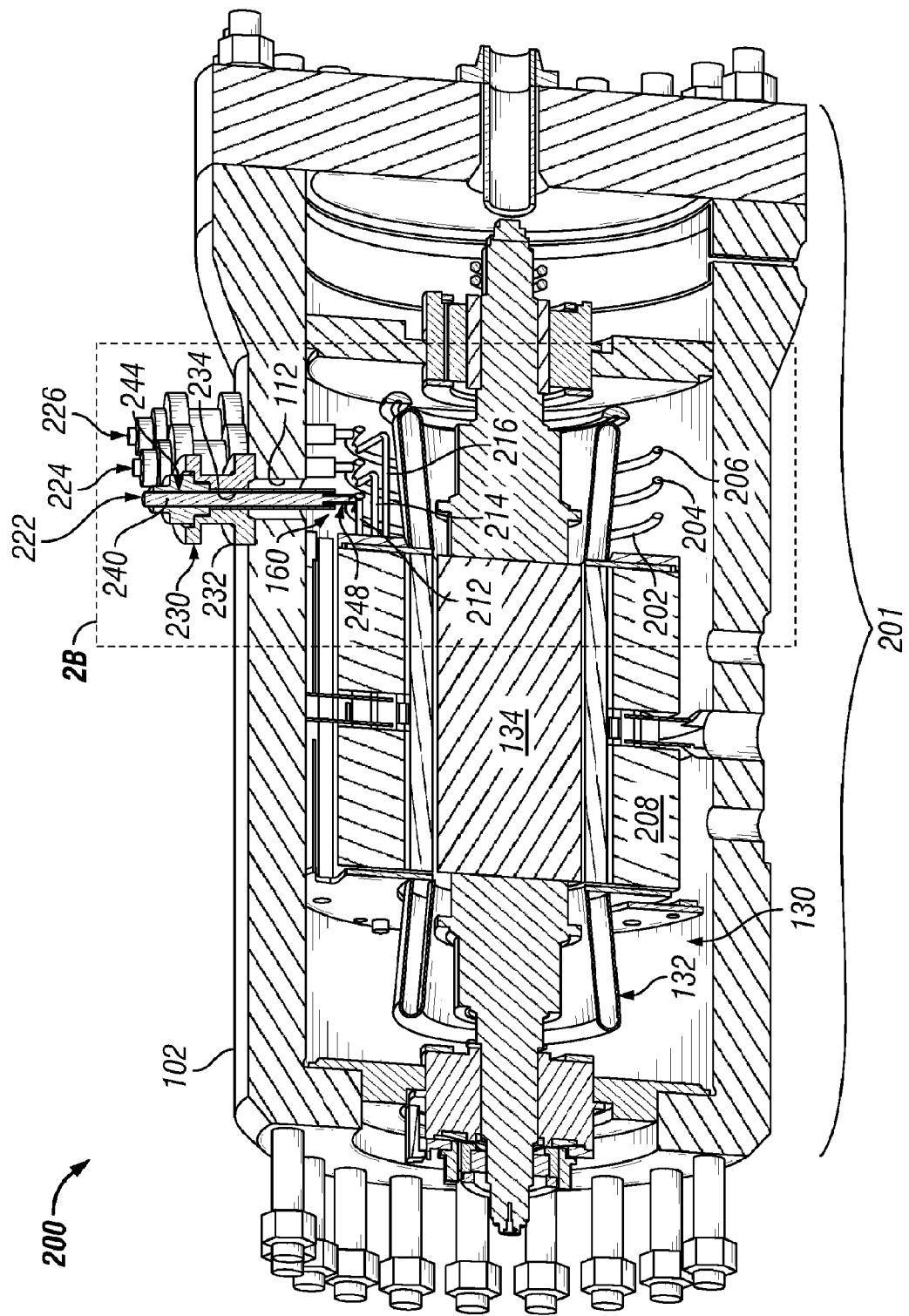
FIG. 2A illustrates a cross-sectional, perspective view of a motor portion of another compact motor-compressor, according to one or more embodiments disclosed.
Figure 2B:
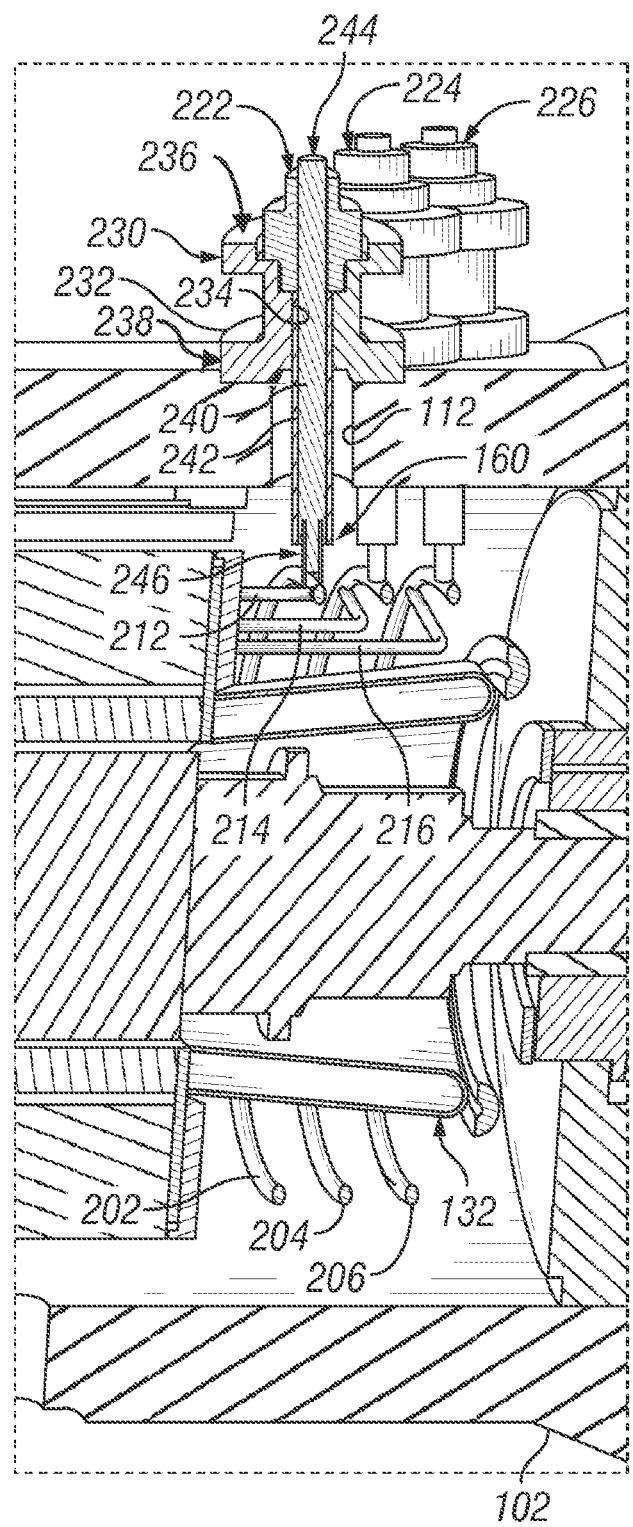
FIG. 2B illustrates an enlarged view of the portion of the compact motor-compressor indicated by the box labeled "2B" of FIG. 2A, according to one or more embodiments disclosed.

FIG. 2A illustrates a cross-sectional, perspective view of an exemplary motor portion 201 of another exemplary compact motor-compressor 200, according to one or more embodiments. FIG. 2B illustrates an enlarged view of the portion of the compact motor-compressor 200 indicated by the box labeled "2B" of FIG. 2A, according to one or more embodiments. The motor-compressor 200 illustrated in FIGS. 2A and 2B may be similar in some respects to the motor-compressor 100 described above and therefore may be best understood with reference to the description of FIG. 1, where like numerals designate like components and will not be described again in detail.

As illustrated in FIGS. 2A and 2B, the stator 132 may include one or more stator rings (three are shown 202, 204, 206) coupled with stator windings 208 of the motor 130. For example, each of the stator rings 202, 204, 206 may be coupled with the stator windings 208 via one or more bus bars (three are shown 212, 214, 216). The bus bars 212, 214, 216 may be configured to receive electrical power from the stator rings 202, 204, 206 respectively coupled therewith, and transmit the electrical power to the stator windings 208 to drive the motor 130.

As illustrated in FIGS. 2A and 2B, the motor-compressor 200 may include one or more HVPs (three are shown 222, 224, 226) coupled with the housing 102. It may be appreciated that each of the HVPs 222, 224, 226 and/or stator rings 202, 204, 206 disclosed herein may include similar components and parts. Accordingly, discussions herein regarding a single HVP 222 and/or stator ring 202 may be equally applicable to the remaining HVPs 224, 226 and/or stator rings 204, 206.

As illustrated in FIG. 2B, the HVP 222 may include a penetrator housing 230 configured to couple the HVP 222 with the housing 102 of the compact motor-compressor 200. For example, the penetrator housing 230 may include an annular collar or flange 232 configured to couple the HVP 222 with the housing 102 about the aperture 112 extending therethrough. The flange 232 may define one or more circumferentially arrayed perforations (not shown), and the perforations may be configured to receive one or more mechanical fasteners (not shown) to facilitate the coupling of the HVP 222 with the housing 102. Illustrative mechanical fasteners may include, but are not limited to, a series of bolts, studs, nuts, and/or any other known mechanical fasteners. Coupling the flange 232 of the HVP 222 with the housing 102 may provide a fluid tight seal therebetween. Accordingly, the HVP 222 may be capable of providing a pressure containing device or barrier between the ambient environment (e.g., sea water) and the interior of the housing 102.

In at least one embodiment, the penetrator housing 230 may define a bore 234 extending from a first end portion 236 to a second end portion 238 thereof. As illustrated in FIGS. 2A and 2B, a conductive rod 240 may extend through the bore 234 of the penetrator housing 230 and into the housing 102 of the motor-compressor 200. The conductive rod 240 may be configured to receive electrical power and direct the electrical power to the stator 132 of the motor 130. For example, a first end portion 244 of the conductive rod 240 may be coupled with one or more electrical cables, such as the electrical cables contained in the conduit 156 previously discussed with reference to FIG. 1, and a second end portion 246 of the conductive rod 240 may be detachably coupled with the stator 132 via the interface 160. In another example, the second end portion 246 of the conductive rod 240 may be detachably coupled with the stator ring 202 of the stator 132 via the interface 160. Accordingly, the conductive rod 240 may receive electrical power and transmit the electrical power to the stator windings 208 via the interface 160, the stator ring 202, and/or the bus bar 212, to thereby drive the motor 130 and operate the motor-compressor 200.

In at least one embodiment, the conductive rod 240 may include a sleeve 242 extending circumferentially about and/or axially along at least a portion thereof and coupled therewith. The sleeve 242 may be configured to insulate and/or protect the conductive rod 240 from the process fluid contained in the housing 102. In at least one embodiment, the sleeve 242 may be at least partially disposed between the conductive rod 240 and the bore 234 of the penetrator housing 230 to provide a fluid tight seal therebetween. The sleeve 242 may be or include a thermoplastic material, such as poly(ether ether ketone) (PEEK) and the like.

Figure 3A:
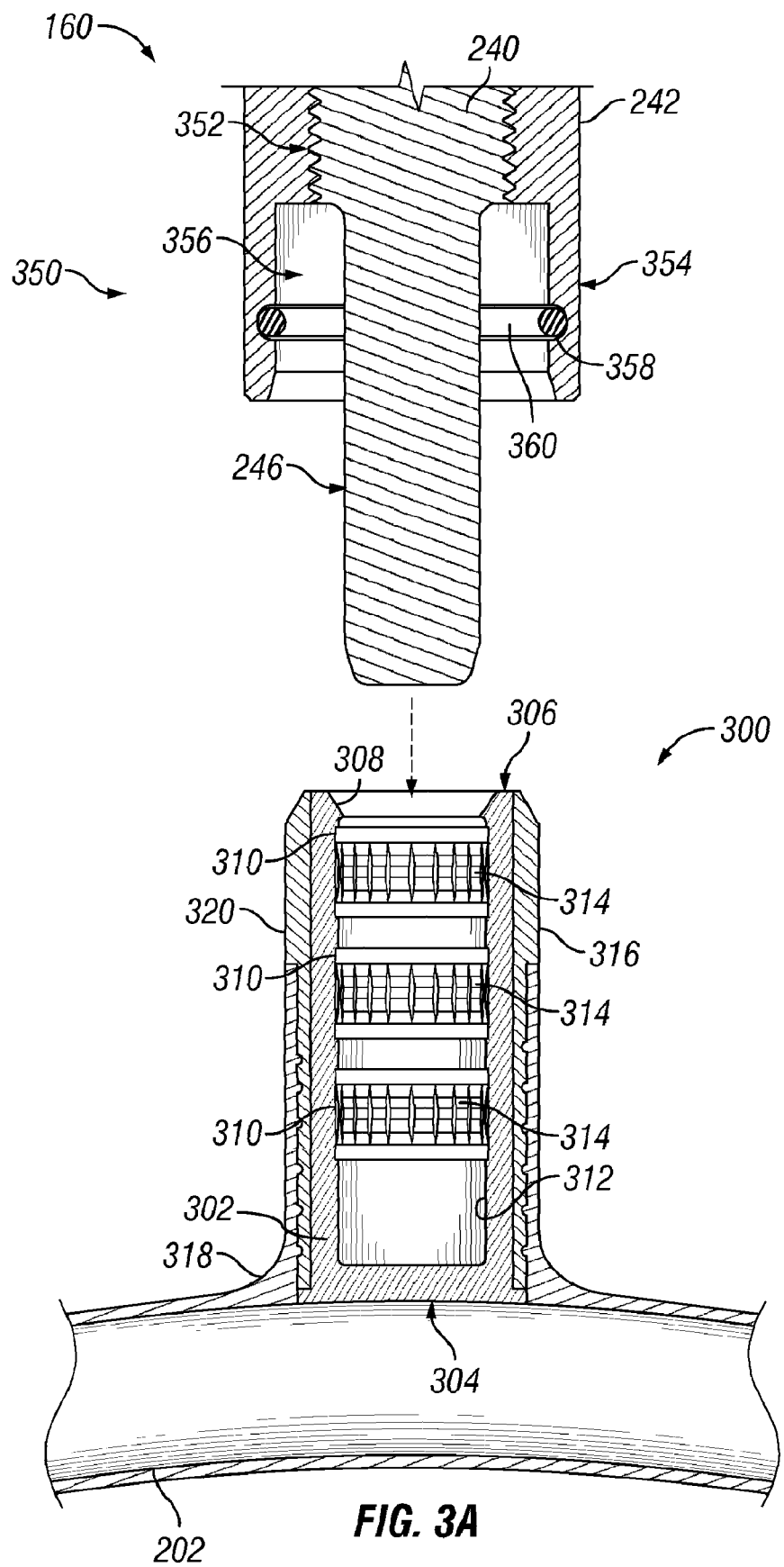
FIG. 3A illustrates a cross-sectional exploded view of an interface that may be utilized in the compact motor-compressors of FIGS. 1, 2A, and 2B, the interface including a plug and a receptacle, according to one or more embodiments disclosed.

FIG. 3A illustrates a cross-sectional exploded view of an interface 160 that may be utilized in the compact motor-compressors of FIGS. 1, 2A, and 2B, the interface 160 including a plug 350 and a receptacle 300, according to one or more embodiments. In at least one embodiment, at least a portion of the conductive rod 240 (see FIGS. 2A and 2B) may be or may form at least a portion of the interface 160. For example, at least a portion the conductive rod 240 may be or may form at least a portion of a male component, or the plug 350, of the interface 160 configured to mate with a female component, or the receptacle 300, of the interface 160 coupled with the stator ring 202.

As illustrated in FIG. 3A, the receptacle 300 may include a conductive body 302 coupled with the stator ring 202 at a first end portion 304 thereof. The body 302 of the receptacle 300 may be electrically coupled with the stator ring 202. For example, the first end portion 304 of the body 302 may be coupled with the stator ring 202 via a brazing process or any other thermal bonding process. The body 302 of the receptacle 300 may define a hole 308 at least partially extending from a second end portion 306 thereof toward the first end portion 304 coupled with the stator ring 202. The hole 308 may be configured to mate with or receive at least a portion of the conductive rod 240. For example, as further described herein, at least a portion of the conductive rod 240 may be or may form at least a portion of the plug 350 of the interface 160. Accordingly, the receptacle 300 may be configured to receive at least a portion of the conductive rod 240 to electrically couple the conductive rod 240 with the stator ring 202.

In at least one embodiment, the interface 160 may include one or more conductive contacts (three are shown 310) configured to facilitate and/or enhance the electric coupling of the plug 350 with the receptacle 300. For example, as illustrated in FIG. 3A, the conductive contacts 310 may be disposed in the hole 308 and may circumferentially extend about at least a portion of an inner surface 312 of the receptacle 300. In at least one embodiment, as illustrated in FIG. 3A, the conductive contacts 310 may be spring loaded conductive contacts 310 having one or more outwardly biased projections 314 configured to engage or contact a corresponding surface, such as a conductive surface of the plug 350. For example, the spring loaded conductive contacts 310 may be a multi-contact strip known in the art as a MULTILAM® commercially available from Multi-Contact of Windsor, Calif. The conductive contacts 310 may be fabricated from beryllium copper (BeCu), corrosion resistant steel, or any other suitable conductive material.

In at least one embodiment, the receptacle 300 may include a shell 316 extending circumferentially about the body 302 and configured to insulate and/or protect the receptacle 300 from the process fluid contained in the housing 102. The shell 316 may also extend substantially from the second end portion 306 of the body 302 to the first end portion 304 of the body 302. The shell 316 may be or include the same material utilized in the sleeve 242 of the conductive rod 240 previously discussed with reference to FIG. 2B. For example, the shell 316 may be or include a thermoplastic material, such as PEEK and the like.

In at least one embodiment, a coating 318 may be applied to at least a portion of the receptacle 300 and/or the stator ring 202 coupled therewith. The coating 318 may be configured to at least partially insulate and/or increase the thermal conductivity of the receptacle 300 and/or the stator ring 202 coupled therewith. The coating 318 may also be configured to at least partially provide a fluid tight seal about the shell 316 of the receptacle 300. The coating 318 may be or include any material capable of providing a barrier to the process fluid contained in the motor-compressor 200. The coating 318 may also be or include any material capable of withstanding or being subjected to rapid gas decompression (RGD) events. For example, the coating 318 may be or include one or more resins, such as an epoxy resin or the like. The coating 318 may be applied via any process or method known in the art, such as vacuum pressure impregnation (VPI) or the like. In at least one embodiment, the coating 318 may be applied to the receptacle 300 during the manufacture of the stator 132. For example, during the manufacture of the stator 132, the stator 132 and/or components thereof (e.g., the stator rings 202, 204, 206) may be subjected to VPI to apply an RGD compliant insulating material, such as an epoxy resin coating, thereto. The epoxy resin coating applied to the coating may be concurrently applied to the receptacle 300 to provide the coating 318 of the receptacle 300.

Figure 3B:
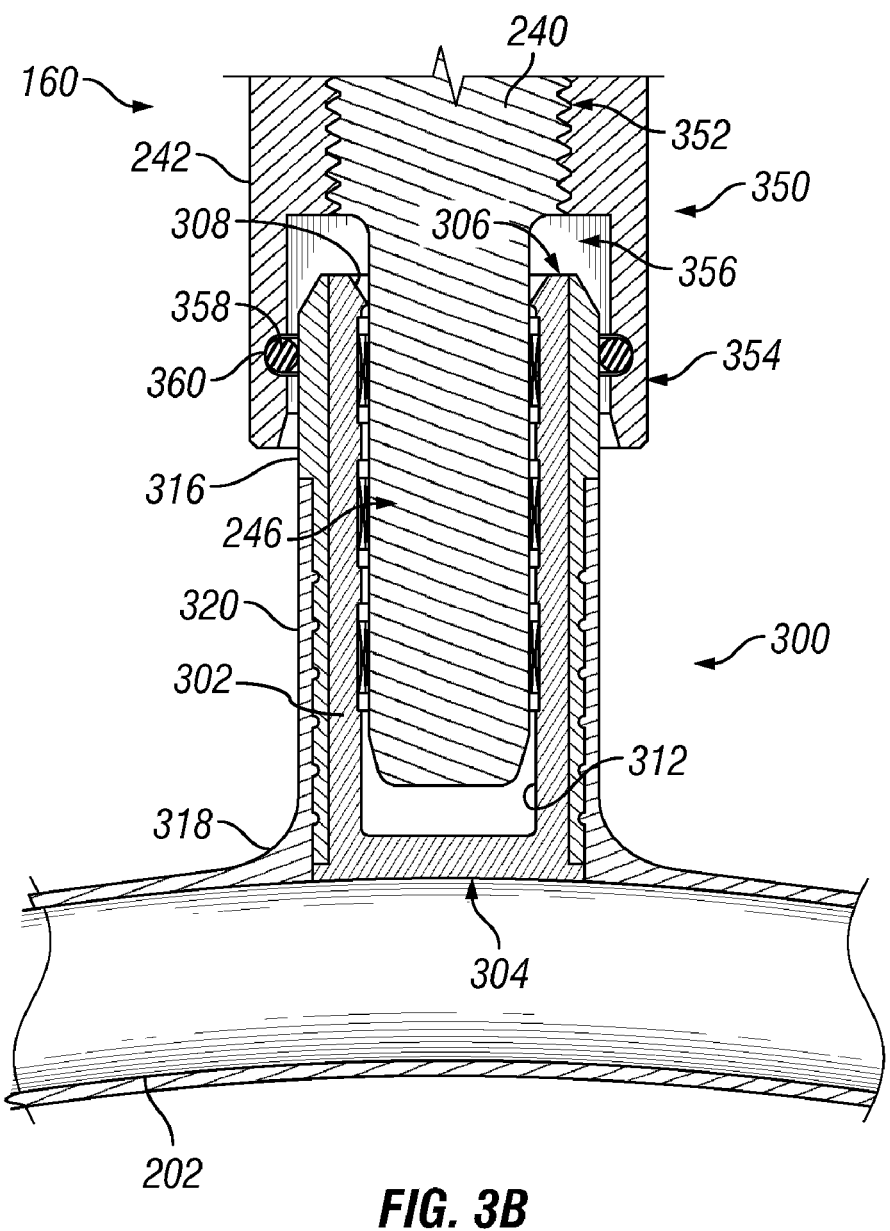
FIG. 3B illustrates a cross-sectional view of the interface of FIG. 3A, wherein the plug and the receptacle are coupled with one another, according to one or more embodiments disclosed.

FIG. 3B illustrates a cross-sectional view of the interface 160 of FIG. 3A, wherein the plug 350 and the receptacle 300 are coupled with one another, according to one or more embodiments. As previously discussed, at least a portion of the conductive rod 240 may be or may form at least a portion of the plug 350 and may be configured to detachably couple with the receptacle 300. For example, as illustrated in FIG. 3B, the second end portion 246 of the conductive rod 240 may form at least a portion of the plug 350 and may be at least partially disposed in the hole 308 of the receptacle 300 to couple the plug 350 and the receptacle 300 with one another. The second end portion 246 of the conductive rod 240 may also be at least partially disposed in the hole 308 of the receptacle 300 to electrically couple the plug 350 and the receptacle 300 with one another. Further, as previously discussed, the conductive contacts 310 circumferentially extending about the inner surface 312 of the receptacle 300 may facilitate and/or enhance the electrical coupling of the plug 350 with the receptacle 300. For example, the outwardly biased projections 314 of the conductive contacts 310 may engage or contact the second end portion 246 of the conductive rod 240 to facilitate and/or enhance the electrical coupling of the plug 350 with the receptacle 300.

In at least one embodiment, the conductive rod 240 may have a stepped diameter along one or more portions thereof. For example, as illustrated in FIGS. 3A and 3B, the second end portion 246 of the conductive rod 240 may have a decreased diameter as compared to a body portion 352 of the conductive rod 240 disposed between the first end portion 244 (FIGS. 2A and 2B) and the second end portion 246 thereof. In at least one embodiment, the sleeve 242 may be coupled and/or secured with the body portion 352 of the conductive rod 240. For example, as illustrated in FIGS. 3A and 3B, the body portion 352 may define threads configured to engage or couple with corresponding threads of the sleeve 242. It may be appreciated, however, that the sleeve 242 may be coupled with the conductive rod 240 via any suitable coupling system or method known in the art. For example, the sleeve 242 may also be coupled with the conductive rod 240 via an adhesive, such as an epoxy based adhesive or the like.

In at least one embodiment, the sleeve 242 may include a lip or protuberance 354 disposed radially outward from the second end portion 246 of the conductive rod 240. As illustrated in FIG. 3A, the protuberance 354 and the second end portion 246 of the conductive rod 240 may at least partially define an annular volume 356 therebetween. As illustrated in FIG. 3B, the annular volume 356 may be configured to receive at least a portion of the receptacle 300 when the plug 350 and the receptacle 300 are coupled with one another. As further illustrated in FIG. 3B, the protuberance 354 may engage an outer circumferential surface 320 of the receptacle 300 when the plug 350 and the receptacle 300 are coupled with one another. The engagement of the protuberance 354 with the outer circumferential surface 320 of the receptacle 300 may provide a fluid tight seal therebetween, thereby substantially preventing the process fluid contained in the motor-compressor 200 from flowing into the annular volume 356 and/or contacting the second end portion 246 of the conductive rod 240.

In a least one embodiment, the protuberance 354 may define one or more circumferential channels or grooves (one is shown 358) extending about an inner surface thereof and having a seal 360 (e.g., O-ring) disposed therein. The seal 360 may engage the outer circumferential surface 320 of the receptacle 300 to provide a fluid tight seal therebetween. In at least one embodiment, the annular volume 356 of the plug 350 may contain one or more dielectric materials configured to substantially prevent the process fluid (e.g., gas-phase process fluid) from being entrained therein. For example, the dielectric materials may be disposed in the annular volume 356 to occupy or fill any voids contained therein, thereby preventing the process fluid from being entrained therein. Illustrative dielectric materials may include, but are not limited to, silicon oil, a dielectric gel, or the like.

It may be appreciated that the interface 160 described herein may electrically couple the HVP 222 with the stator 132 without utilizing flexible cables. For example, the interface 160 described herein may utilize a rigid or semi-rigid conductive rod 240 and a rigid or semi-rigid conductive receptacle 300 to transmit electrical power from the HVP 222 to the stator 132. The rigid or semi-rigid conductive rod 240 and the rigid or semi-rigid receptacle 300 may have a greater resistance to deformation as compared to the flexible cables. Eliminating the use of the flexible cables may substantially prevent failure of the motor-compressor 200. For example, the flexible cables utilized in conventional compact motor-compressors include flexible insulating materials that are susceptible to failure (e.g., rupture) in RGD events. Utilizing the rigid or semi-rigid conductive rod 240 and the rigid or semi-rigid receptacle 300 in lieu of the flexible cables may allow the interface 160, and/or components thereof, to be insulated with the same insulating material (e.g., RGD compliant insulating material) as that utilized for the stator 132, which may exhibit a decreased susceptibility to failure in RGD events. Further, utilizing the rigid or semi-rigid conductive rod 240 and the rigid or semi-rigid receptacle 300 may allow the plug 350 to be detached or separated from the receptacle 300 without disturbing and/or compromising the structural integrity of the insulating material. Accordingly, the interface 160 described herein may allow maintenance of the motor 130, the stator 132, the penetrator assembly 150, and components thereof without disturbing and/or compromising the structural integrity of the insulating material.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. An interface for transmitting electrical power to a motor of a motor-compressor, comprising:
    a receptacle having a first end portion coupled with a stator of the motor and a second end portion defining a hole at least partially extending therethrough;
    a shell extending circumferentially about and coupled with the receptacle, the shell configured to at least partially insulate the receptacle from process fluid contained in the motor-compressor; and
    a plug comprising a rigid, conductive rod having a first end portion configured to be coupled with a penetrator of the motor-compressor, and a second end portion configured to be at least partially disposed in the hole of the receptacle and detachably coupled therewith,
    wherein the rigid, conductive rod is configured to electrically couple the penetrator with the receptacle, and the receptacle is configured to transmit the electrical power to the stator.

2. The interface of claim 1, wherein the stator further comprises a stator ring and stator windings coupled with one another, and the first end portion of the receptacle is coupled with the stator ring and configured to transmit the electrical power to the stator windings via the stator ring.

3. The interface of claim 1, further comprising a conductive contact disposed in the hole of the receptacle and extending circumferentially about an inner surface of the second end portion defining the hole, the conductive contact configured to engage the second end portion of the rigid, conductive rod and electrically couple the plug and the receptacle with one another.

4. The interface of claim 1, further comprising a coating disposed about at least a portion of the shell and at least a portion of the stator of the motor, the coating configured to at least partially insulate the receptacle and the stator from the process fluid contained in the motor-compressor.

5. The interface of claim 1, further comprising a sleeve disposed circumferentially about and coupled with the rigid, conductive rod between the first end portion and the second end portion of the rigid, conductive rod.

6. The interface of claim 5, wherein the sleeve further comprises a protuberance disposed radially outward from the second end portion of the rigid, conductive rod, the protuberance configured to engage an outer circumferential surface of the receptacle to thereby provide a fluid tight seal therebetween.

7. An interface for transmitting electrical power to a motor of a motor-compressor, comprising:
    a penetrator assembly detachably coupled with a housing of the motor-compressor about an aperture extending through the housing, the penetrator assembly configured to receive the electrical power from a power source located external to the housing and transmit the electrical power to the motor disposed in the housing;
    a receptacle having a first end portion coupled with a stator of the motor and a second end portion defining a hole at least partially extending therethrough, wherein the stator further comprises a stator ring and stator windings coupled with one another via a bus bar, and the first end portion of the receptacle is coupled with the stator ring and configured to transmit the electrical power to the stator windings via the stator ring and the bus bar; and
    a plug comprising a rigid, conductive rod having a first end portion coupled with the penetrator assembly and a second end portion configured to be at least partially disposed in the hole of the receptacle and detachably coupled therewith, the rigid, conductive rod configured to electrically couple the penetrator assembly with the receptacle.

8. The interface of claim 7, further comprising a conductive contact disposed in the hole of the receptacle and extending circumferentially about an inner surface of the second end portion defining the hole, the conductive contact configured to electrically couple the plug and the receptacle with one another.

9. The interface of claim 7, further comprising a sleeve disposed circumferentially about and coupled with the rigid, conductive rod between the first end portion and the second end portion of the rigid, conductive rod.

10. The interface of claim 9, wherein the sleeve further comprises a protuberance disposed radially outward from the second end portion of the rigid, conductive rod and configured to engage an outer circumferential surface of the receptacle to thereby provide a fluid tight seal therebetween.

11. The interface of claim 10, wherein the protuberance and the second end portion of the rigid, conductive rod at least partially define an annular volume therebetween, the annular volume having a dielectric gel disposed therein.

12. The interface of claim 7, further comprising a shell extending circumferentially about and coupled with the receptacle, the shell configured to at least partially insulate the receptacle from process fluid contained in the motor-compressor.

13. The interface of claim 12, further comprising a coating disposed about at least a portion of the shell and at least a portion of the stator of the motor, the coating configured to at least partially insulate the receptacle and the stator from the process fluid contained in the motor-compressor.

14. A motor-compressor comprising:
a housing having a motor disposed therein, the housing defining an aperture extending therethrough;
a penetrator detachably coupled with the housing about the aperture and configured to transmit electrical power to the motor;
a conduit coupled with a power source located external to the housing and the penetrator, the conduit configured to transmit the electrical power from the power source to the penetrator;
a receptacle coupled with a stator of the motor;
a rigid, conductive plug having a first end portion coupled with the penetrator and a second end portion configured to be detachably coupled with the receptacle, the rigid, conductive plug configured to electrically couple the penetrator with the receptacle; and
a coating disposed about at least a portion of the receptacle and at least a portion of the stator of the motor, the coating configured to at least partially insulate the receptacle and the stator from the process fluid contained in the motor-compressor.

15. The motor-compressor of claim 14, wherein the coating is poly(ether ether) ketone.

16. The motor-compressor of claim 14, wherein a first end portion of the receptacle is coupled with the stator and a second end portion defines a hole at least partially extending therethrough, the hole configured to receive the second end portion of the rigid, conductive plug.

17. The motor-compressor of claim 14, further comprising a sleeve disposed circumferentially about and coupled with the rigid, conductive plug, the sleeve configured to engage an outer circumferential surface of the receptacle to thereby provide a fluid tight seal therebetween.

* * * * *